United States Patent [19]

Kobayashi et al.

[11] Patent Number: 5,445,883
[45] Date of Patent: Aug. 29, 1995

[54] LAMINATE

[75] Inventors: Seizo Kobayashi; Takashi Mizoe; Yoshimu Iwanami; Shigeki Yokoyama, all of Yokohama; Keizi Jimbo, Yokosuka, all of Japan

[73] Assignee: Nippon Oil Co., Ltd., Tokyo, Japan

[21] Appl. No.: 272,629

[22] Filed: Jul. 11, 1994

Related U.S. Application Data

[63] Continuation of Ser. No. 973,571, Nov. 9, 1992, abandoned, which is a continuation of Ser. No. 516,926, Apr. 30, 1990, abandoned.

[30] Foreign Application Priority Data

May 8, 1989 [JP] Japan .................. 1-113675

[51] Int. Cl.$^6$ ............................................. C09J 7/02
[52] U.S. Cl. ........................... 428/355; 428/516; 428/520; 428/910
[58] Field of Search ............. 428/355, 349, 516, 520, 428/910

[56] References Cited

U.S. PATENT DOCUMENTS

| | | | |
|---|---|---|---|
| 4,543,286 | 9/1985 | Harpell | 428/288 |
| 4,597,818 | 7/1986 | Aoyama | 428/517 |
| 4,812,355 | 3/1989 | Yokoyama | 428/246 |
| 4,876,049 | 10/1989 | Aoyama | 428/245 |
| 4,877,679 | 10/1989 | Leatherman | 428/283 |
| 4,892,779 | 1/1990 | Leatherman | 428/779 |

FOREIGN PATENT DOCUMENTS 284939 10/1988 European Pat. Off.

OTHER PUBLICATIONS

Zachariades; "Solid-State Extrusion of Polymer Powders illustrated with Ultrahigh-Molecular-Weight Polyethylene"; Journal of Polymer Science; vol. 17, pp. 485–488; 1979.
World Patent Index Latest, Accession No. 84-273890 Week 44, Derwent Publications Ltd., London GB & JP-A-59169858 (Oishi Sangyo KK) Sep. 25, 1984.
World Patents Index Latest, Accession No. 86-209477 Week 32, Derwent Publications Ltd., London GB & JP-A-61143137 (Nippon Petrochem. KK) Jun. 30, 1986.
World Patents Index Latest, Accession No. 82-40334E Week 20, Derwent Publications Ltd., London GB & JP-A-57059721 (Nitto Elect. Ind. KK) Apr. 10, 1982.
World Patents Index Latest, Accession No. 84-085759 Week 14, Derwent Publications Ltd., London GB & JP-A-59035940 (Asahi Yukizai Kogyo) Feb. 27, 1984.

*Primary Examiner*—Jenna L. Davis
*Attorney, Agent, or Firm*—Oblon, Spivak, McClelland, Maier & Neustadt

[57] ABSTRACT

An anisotropy-free laminate having much higher strength and stiffness as compared with conventional articles is here disclosed which can be prepared by laminating an orientated ultra-high-molecular-weight polyethylene onto an adhesive layer obtained by modifying an olefin polymer with an unsaturated carboxylic acid and/or its derivative at a temperature lower than the melting point of the orientated ultra-high-molecular-weight polyethylene. The anisotropy-free material having high strength and high stiffness of the present invention can be substituted for various materials such as metals, lumber and FRP, and is also lightweight and excellent in water resistance.

36 Claims, No Drawings

LAMINATE

This is a continuation of application Ser. No. 07/973,571, filed Nov. 9, 1992, abandoned, which is a continuation of application Ser. No. 07/516,926, filed Apr. 30, 1990, now abandoned.

BACKGROUND OF THE INVENTION (a) Field of the Invention

The present invention relates a laminate, and more specifically, it relates to an anisotropy-free laminate having high strength and high stiffness which comprises a specific orientated polyethylene layer and a specific adhesive layer.

(b) Description of the Prior Art

The so-called ultra-high-molecular-weight polyethylenes having noticeably high molecular weights are excellent in impact resistance and wear resistance and have self-lublicating properties, and therefore they are used as characteristic engineering plastics in many fields.

This ultra-high-molecular-weight polyethylene has a much higher molecular weight than a usual polyethylene, and thus it is known that a fiber or sheet having higher strength and higher stiffness than before can be obtained by highly orientating the ultra-high-molecular-weight polyethylene.

However, in the case of the sheet, physical values such as strength in a direction perpendicular to an orientating direction and modulus of elasticity are extremely low owing to its high anisotropy, and thus applications of the sheet are limited. Here, it can be expected that the directional property-free sheet having high strength and high stiffness can be obtained by superposing and sticking, for example, the two sheets on each other, these sheets being mutually diverted from each other as much as an angle of 90°, but when the conventional adhesion technique is employed, adhesive force is weak and physical properties such as strength and stiffness deteriorate inconveniently. For this reason, such a technique is not practical.

For example, in a suggested laminate in which the ultra-high-molecular-weight polyethylene is used, a press molded rod-like or plate-like ultra-high-molecular-weight polyethylene material is skived to form a sheet, and the latter is then stuck on another substrate via an adhesive polymer (Japanese Patent Laid-open Publication No. 143137/1986).

However, this kind of laminate is proved with a feature of the ultra-high-molecular-weight polyethylene such as wear resistance, but it has some drawbacks of the other kind of material simultaneously. In addition, functional effects such as high strength and high stiffness cannot be obtained because of non-orientation. Therefore, the suggested laminate is not always satisfactory from the viewpoint of performance.

On the other hand, in order to form the laminate, it is necessary to heat the resins of both the layers up to a higher temperature than their melting points so as to thermally fuse them, but When the orientated materials are heated in excess of their melting points, the effect of orientation is lost and tensile performance deteriorates noticeably.

SUMMARY OF THE INVENTION

An object of the present invention is to provide an anisotropy-free laminate having high strength and high stiffness by combining a specific orientated polyethylene layer with a specific adhesive layer.

That is, the present invention intends to provide a laminate comprising (A) an orientated polyethylene layer obtained by orientating an ultra-high-molecular-weight polyethylene sheet at a temperature lower than the melting point of this polyethylene, the aforesaid polyethylene sheet having an intrinsic viscosity of 5 to 50 dl/g in decalin at 135° C., and (B) an adhesive layer containing a resin obtained by modifying an olefin polymer with an unsaturated carboxylic acid and/or its derivative.

According to the present invention, an anisotropy-free material having high strength and high stiffness can be prepared which can be substituted for various materials such as metals, lumber and FRP and which is light-weight and excellent in water resistance.

DETAILED DESCRIPTION OF THE INVENTION

Now, the present invention will be described in detail.

Surprisingly, an orientated ultra-high-molecular-weight polyethylene can be stuck on an adhesive layer obtained by modifying an olefin polymer with an unsaturated carboxylic acid and/or its derivative even at a temperature lower than the melting point of the orientated ultra-high-molecular-weight polyethylene, and the above-mentioned lamination of these layers permits providing an anisotropy-free laminate having much higher strength and stiffness as compared with conventional articles.

Next, the respective layers used in the present invention will be described in more detail.

(1) Orientated polyethylene layer (A)

The orientated polyethylene layer (A) of the present invention can be obtained in the form of a sheet or film by orientating an ultra-high-molecular-weight polyethylene having a specific molecular weight at a temperature less than the melting point of the polyethylene.

The ultra-high-molecular-weight polyethylene has an intrinsic viscosity of 5 to 50 dl/g, preferably 8 to 40 dl/g, more preferably 10 to 30 dl/g in decalin at 135° C. which correspond to a viscosity average molecular weight of 500,000 to 12,000,000, 900,000 to 9,000,000, and 1,200,000 to 6,000,000, respectively. When the intrinsic viscosity is less than 5 dl/g, the orientated sheet or film has poor mechanical properties. Inversely, when it is more than 50 dl/g, workability such as tensile orientation deteriorates inconveniently.

The ultra-high-molecular-weight polyethylene having the above-mentioned specific properties which is used in the present invention can be obtained by the homopolymerization of ethylene or the copolymerization of ethylene and α-olefin in the presence of a catalyst comprising a catalytic component containing at least one of compounds in which transition metal elements in the groups IV to VI of the periodic table are present and, if necessary, an organic metal compound.

The usable α-olefin has 3 to 12 carbon atoms, preferably 3 to 6 carbon atoms. Typical examples of the α-olefin include propylene, butene-1, 4-methylpentene-1, hexene-1, octene-1, decene-1 and dodecene-1. Of these examples, propylene, butene-1, 4-methylpentene-1, hexene-1 are preferable. Furthermore, examples of a comonomer include dienes such as butadiene, 1,4-hexadiene, vinylnor bornene and ethylidene-norbornene, and they may be used in combination. The content of α-olefin in the ethylene-α-olefin copolymer is from 0.001 to 10 mole%, preferably 0.01 to 5 mole%, more preferably 0.1 to 1 mole%.

Typical and suitable examples of the compounds containing transition metal elements in the groups IV to VI of the periodic table which comprise the catalytic component include titanium compounds, vanadium compounds, chromium compounds, zirconium compounds and hafnium compounds. These compounds may be used in combination of plural kinds.

Examples of the titanium compounds include halides, alkoxy halides, alkoxides and halogenated oxides of titanium, and compounds of tetravalent titanium and trivalent titanium are preferable. Typical examples of the tetravalent titanium compounds include those represented by the general formula $$Ti(OR)_n X_{4-n}$$

wherein R is an alkyl group having 1 to 20 carbon atoms, ah aryl group or an aralkyl group, X is a halogen atom, and n is $0 \leq n \leq 4$, and in particular, titanium tetrachloride is preferable.

An example of the trivalent titanium compound includes titanium trihalide such as titanium trichloride, and other examples of the trivalent titanium compounds include those which can be obtained by reducing tetravalent alkoxytitanium halides represented by the general formula $$Ti(OR)_m X_{4-m}$$

wherein R is an alkyl group having 1 to 20 carbon atoms, an aryl group or an aralkyl group, X is a halogen atom, and m is $0 \leq m \leq 4$, with an organic metal compound of a metal in the groups I to III of the periodic table.

Of these titanium compounds, particularly preferable ones are the compounds of tetravalent titanium.

Examples of the vanadium compound include halides, alkoxy halides, alkoxides and halogenated oxides of vanadium. Typical examples of the vanadium compound include vanadium tetrahalide such as vanadium tetrachloride, a compound of tetravalent vanadium such as tetraethoxyvanadium, compounds of pentavalent vanadium such as vanadium oxytrichloride, ethoxydichlorovanadium, triethoxyvanadium and tributoxyvanadium, and compounds of trivalent vanadium such as vanadium trichloride and vanadium triethoxide.

The above-mentioned titanium compound or vanadium compound may be treated with one or more of electron-donating compounds. Examples of the electron-donating compounds include ethers, thioethers, thiolphosphines, stibines, arsines, amines, amides, ketones and esters.

The titanium compound or the vanadium compound may be used together with a magnesium compound. Examples of the jointly usable magnesium compound include metallic magnesium, magnesium hydroxide, magnesium carbonate, magnesium oxide, magnesium fluoride, magnesium chloride, magnesium bromide, magnesium iodide; double salts, double oxides, carbonates, chlorides and hydroxides containing a magnesium atom and a metal selected from silicon, aluminum and calcium; those which can be obtained by treating or reacting these inorganic solid compounds with an oxygen-containing compound, a sulfur-containing compound, an aromatic hydrocarbon or a halogen-containing material; and oxides containing silicon or aluminum and the above-mentioned magnesium compounds.

In the case that the titanium compound or the vanadium compound is used together with the magnesium compound, any particular restriction is not put on a contact manner of both the compounds and therefore a known manner can be employed.

Examples of the oxygen-containing compound include water, organic oxygen-containing compounds such as alcohols, phenols, ketones, aldehydes, carboxylic acids, esters, polysiloxanes and acid amides, and inorganic oxygen-containing compounds such as metal alkoxides and oxychlorides of metals. Examples of the sulfur-containing compound include organic sulfur-containing compound such as thiols and thioethers, and inorganic sulfur-containing compounds such as sulfur dioxide, sulfur trioxide and sulfuric acid. Examples of the aromatic hydrocarbon include various monocyclic and polycyclic aromatic hydrocarbons such as benzene, toluene, xylene, anthracene and phenanthrene. Moreover, examples of the halogen-containing material include chlorine and compounds such as hydrogen chloride, metal chlorides and organic halides.

Another example of the catalyst system is a catalyst obtained by combining an organic aluminum compound with a reaction product of the titanium compound and an organic magnesium compound such as the so-called Grignard compound.

A further other example of the catalyst system is a catalyst obtained by combining an organic aluminum compound with a solid material which can be prepared by bringing an inorganic oxide such as $SiO_2$ or $Al_2O_3$ into contact with the above-mentioned solid catalyst component containing magnesium and titanium.

In these catalyst systems, the titanium compound can be used as an adduct with an organic carboxylic acid ester, and the above-mentioned inorganic solid compound containing magnesium can be used after subjected to a contact treatment with an organic carboxylic acid ester. Furthermore, the organic aluminum compound can be used as an adduct with an organic carboxylic acid ester without any problem. In every case, the catalyst prepared in the presence of an organic carboxylic acid ester can be utilized without any problem.

A typical example of the chromium compound catalyst is what is called the Phillips catalyst in which chromium trioxide or a compound capable of partially forming chromium oxide by calcination is supported on an inorganic oxide carrier. Examples of the inorganic oxide carrier include silica, alumina, silica-alumina, titania, zirconia and thoria and mixtures thereof, and above all, silica and silica-alumina are preferable.

Examples of the chromium compound which can be supported on the carrier include oxides of chromium and compounds of at least partially forming chromium oxide by calcination, for example, halides, oxyhalides, nitrates, acetates, sulfates and alcoholates of chromium. Typical examples of the chromium compound include chromium trioxide, chromium chloride, potassium dichromate, ammonium chromate, chromium nitrate, chromium acetate, chromacetylacetonato and ditertiary butyl chromate.

The chromium compound can be supported on the carrier in a known manner such as impregnation, distillation removal of a solvent or sublimation, and so a suitable supporting manner can be selected in compliance with the kind of chromium compound to be used.

The amount of chromium to be supported is from 0.1 to 10% by weight, preferably from 0.3 to 5% by weight, more preferably from 0.5 to 3% by weight with respect to the weight of the carrier in terms of a chromium atom.

The carrier on which the chromium compound has been supported in the above-mentioned manner is then calcined so as to activate the same. The activation by the calcination is usually carried out in a substantially water-free non-reducing atmosphere, for example, in the presence of oxygen, but it may be effected in the presence of an inert gas or under reduced pressure. Preferably, dried air is used. The calcination is carried out at a temperature of 450° C. or higher, preferably 500° to 900° C. for an interval of from several minutes to several hours, preferably from 0.5 to 10 hours. The activation is preferably carried out using plenty of dried air, e.g., under a fluidized state.

At the time of the supporting treatment or the calcination, the activation can be adjusted in a known manner, for example, by adding a titanate or a salt containing fluorine.

Furthermore, the catalyst supporting the chromium compound may be reduced with carbon monoxide, ethylene or organic aluminum prior to its using.

Examples of the zirconium compound and the hafnium compound include zirconium compounds and hafnium compounds in which a group having a conjugated π electron is present as a ligand, and typical examples thereof are compounds represented by the general formula $$R^1_a R^2_b M R^3_c R^4_d$$

wherein M is a zirconium atom or a hafnium atom; each of $R^1$, $R^2$, $R^3$ and $R^4$ is a hydrocarbon residue having 1 to 20 carbon atoms, a halogen atom or a hydrogen atom, and at least one of $R^1$, $R^2$, $R^3$ and $R^4$ is the hydrocarbon residue; and a, b, c and d are values which meet the condition formula of $a+b+c+d=4$. Preferable examples of the hydrocarbon residue in the formula include an alkyl group, an aryl group, a cycloalkyl group, an aralkyl group, an alkoxy group, a cycloalkadienyl group, a sulfur-containing hydrocarbon residue, a nitrogen-containing hydrocarbon residue and a phosphorus-containing hydrocarbon residue.

Examples of the above-mentioned alkyl group include methyl, ethyl, propyl, isopropyl, butyl, hexyl, octyl, 2-ethylhexyl, decyl and oleyl groups; and examples of the aryl group include phenyl and tolyl groups; examples of the cycloalkyl group include cyclopentyl, cyclohexyl, cyclooctyl, norbornyl and bicyclononyl groups; and examples of the aralkyl group include benzyl and neophyl groups.

Examples of the cycloalkadienyl group include cyclopentadienyl, methylcyclopentadienyl, ethylcyclopentadienyl, dimethylcyclopentadienyl, indenyl and tetrahydroindenyl groups; and examples of the alkoxy group include methoxy, ethoxy, propoxy and butoxy groups. Examples of the sulfur-containing hydrocarbon residue include thioethyl and thiophenyl groups; and examples of the nitrogen-containing hydrocarbon residue include dimethylamide, diethylamide and dipropylamide groups.

Other examples of the above-mentioned hydrocarbon residue include unsaturated fatty residues such as vinyl, allyl, propenyl, isopropenyl and 1-butenyl groups, and an unsaturated alicyclic group such as a cyclohexenyl group. Examples of the halogen atom include fluorine, chlorine and bromine.

Needless to say, the above-mentioned zirconium compound or hafnium compound can be used by supporting the compound itself on the aforesaid inorganic oxide carrier.

One example of the organic metallic compound used in the method for the preparation of the ultra-high-molecular-weight polyethylene powder of the present invention is an organic metallic compound containing a metal in the groups I to IV of the periodic table which is known as one component of the Ziegler type catalyst. Preferable examples of this organic metallic compound include organic aluminum compounds represented by the general formula $R_n Al_{3-n}$ (wherein R is an alkyl group having 1 to 20 carbon atoms, an aryl group or an alkoxy group; X is a halogen atom; and n is $0 < n \leq 3$, and in the case of $N \geq 2$, the respective R's may be identical or different), organic zinc compounds represented by the general formula $R_2Zn$ (wherein R is an alkyl group having 1 to 20 carbon atoms, and both of R's may be identical or different), and mixtures thereof.

Examples of the organic aluminum compound include triethylaluminum, triisobutylaluminum, tri-n-hexylaluminum, diethylaluminum chloride, monoethoxydialkylaluminum and diethoxymonoalkylaluminum, and compounds represented by the following general formula which can be obtained by reacting trialkylaluminum with water can be also used:

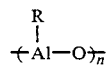

wherein R is a hydrocarbon group having 1 to 18 carbon atoms, and n is a value of $2 \leq n \leq 100$, preferably $2 \leq n \leq 50$.

Any particular restriction is not put on the amount of the organic metal compound to be used, but usually it is used 0.1 to 1,000 mole times as much as that of the transition metal compound.

The polymerization reaction is carried out in a substantially oxygen-free and water-free condition in a gaseous phase or in the presence of a solvent which is inert to the catalyst or by using the monomer itself as the solvent, and examples of the solvent which is inert to the catalyst include aliphatic hydrocarbons such as butane, isobutane, pentane, hexane, octane, decane and dodecane; alicyclic hydrocarbons such as cyclopentane and cyclohexane; aromatic hydrocarbons such as benzene and toluene; and petroleum fractions. Polymerization temperature is lower than the melting point of the ultra-high-molecular-weight polyethylene which will be produced, and it is usually from $-20°$ to $110°$ C., preferably from $0°$ to $90°$ C.

When the polymerization temperature is higher than the melting point of the ultra-high-molecular-weight polyethylene, a 20-fold or more orientation magnification cannot be achieved in a subsequent orientation step unpreferably.

Polymerization pressure is usually from 0 to 70 kg/cm²G, preferably from 0 to 60 kg/cm²G.

The molecular weight of the polymerization product can be adjusted by changing the polymerization temperature, the polymerization pressure, the kind of catalyst, the molar ratio of the catalytic component, the addition of hydrogen to the polymerization system and the like, and any particular restriction is not put on a molecular weight adjustment manner.

Needless to say, a two-stage or multi-stage polymerization in which polymerization conditions such as hydrogen concentration and polymerization temperature are different can also be carried out without any problem.

Thus, the powdery ultra-high-molecular-weight polyethylene can be obtained.

The orientated polyethylene layer (A) of the present invention can be prepared by orientating the thus obtained ultra-high-molecular-weight polyethylene having specific properties at a temperature lower than the melting point of the ultra-high-molecular-weight polyethylene, usually by compression-molding at lower than the melting point of the ultra-high-molecular-weight polyethylene powder, and then orientating the same, or alternatively by carrying out the above-mentioned compression molding, then rolling and orientating the same.

The pressure in the compression molding step can be selected from a wide range, and it is usually from 0.1 MPa to 2 GPa, preferably 1 to 500 MPa.

Furthermore, the temperature in the compression molding step is lower than the melting point of the ultra-high-molecular-weight polyethylene, usually at a temperature of 90° to 140° C., preferably 110° to 135° C.

As techniques of the tensile orientation which follows the compression molding step, there are nip orientation, roll orientation, hot air orientation, cylinder orientation, hot plate orientation and the like, and in these orientation manners except the nip orientation manner, the orientation is effected between a pair of nip rolls or crowbar rolls having different speeds.

The temperature in the tensile orientation step is lower than the melting point of the ultra-high-molecular-weight polyethylene, usually at a temperature of 20° to 160° C., preferably 60 to 150° C., more preferably 90° to 145° C., especially more preferably 90° to 140° C. and most preferably 90° to 130° C.

A tensile orientation velocity can be suitably selected, depending upon techniques of the tensile orientation, the molecular weight and composition ratio of the polymer. Usually, in a batch orientation, it is in a range of from 1.0 to 100 mm/minute, preferably 5 to 50 mm/minute, but the higher velocity is economical, and so it is preferably in a continuous orientation, in a range of from 0.1 to 500 m/minute, preferably 1.0 to 100 m/minute, more preferably 10 to 200 m/minute.

Needless to say, the operation of the tensile orientation can be carried out once or more in a multi-stage system. In this case, it is preferred that the temperature in the first stage is higher than in the second stage.

The rolling can be carried out by a known manner, but the molded sheet may be rolled by a pair of pressure rolls having different rotational directions, while the polyethylene used in the present invention is maintained in a solid phase without melting the same, so that a rolled sheet or film is obtained. At this time, a deformation ratio of the material by the rolling operation can be selected in a wide range, and in general, this ratio is from 1.2 to 20, preferably from 1.5 to 10 in terms of a rolling magnification (length of the material after the rolling/that of the material before the rolling). In the rolling operation, the temperature of the material is 20° C. or higher and lower than its melting point, preferably 90° C. or higher and lower than its melting point. Needless to say, multi-stage rolling is also possible in which the rolling operation is repeated once or more.

It is desirable to increase the orientation magnification of the tensile orientation or the total orientation magnification of the rolling and the tensile orientation as much as possible, but as for the ultra-high-molecular-weight polyethylene of the present invention, the above-mentioned magnification is usually from 20 times or more, preferably 60 times or more, more preferably from 80 to 200 times.

As described above, it is essential that the respective steps of from the compression step to the rolling step are carried out at a temperature lower than the melting point $[T_{m0} (°C.)]$ of the ultra-high-molecular-weight polyethylene powder to be used, and when this temperature is in excess of $T_{m0}$, it is difficult to achieve an orientation magnification of 20 times or more. In the present invention, the melting point of the polyethylene in a step in front of the orientation step, i.e., the melting point $[T_{m1} (°C.)]$ of the polyethylene after the compression molding step or the rolling step must meet the following relation formula:

$$T_{m1} \geq T_{m0} - 5$$

If the polyethylene is melted prior to reaching the orientation step, the above formula cannot be met, so that the cut of the material occurs in the orientation step, or even if the orientation is accomplished, physical values of the product cannot be expected.

According to the above-mentioned method, the fiber-like, sheet-like or film-like orientated polyethylene layer (A) having a tensile modulus of elasticity of 50 GPa or more can be obtained.

No particular restriction is put on the thickness of the sheet-like or film-like orientated polyethylene layer (A), so long as the objects of the present invention can be achieved by the layer. However, the thickness of the layer is usually from 10 to 500 μm, preferably from 50 to 500 μm, more preferably from 100 to 300 μm.

(2) Adhesive layer (B)

The laminate of the present invention is composed of the aforesaid orientated polyethylene layer (A) and an adhesive layer (B). The latter (B) used in the present invention is an adhesive resin layer obtained by modifying an olefin polymer with an unsaturated carboxylic acid and/or its derivative, or an olefin polymer layer containing the adhesive resin.

Examples of the olefin polymer include ethylene polymers and ethylene-α-olefin copolymers prepared in the presence of a Ziegler catalyst, ethylene polymers prepared by high-pressure radical polymerization, and mixtures thereof. Above all, ethylene-α-olefin copolymers are particularly preferred. As α-olefin which will copolymerize with ethylene, various kinds thereof can be used, but the preferable α-olefin has 3 to 12 carbon atoms, preferably 3 to 8 carbon atoms. Typical examples of the α-olefin include propylene, butene-1, pentene-1, 4-methylpentene-1, hexene-1, octene-1, decene-1, dodecene-1 and mixtures thereof. The content of the α-olefin in the ethylene-α-olefin copolymer is 20 moles or less, preferably 15 moles or less.

Furthermore, the above-mentioned polyethylenes prepared by the high-pressure method which can be used as the adhesive layer (B) include an ethylene-vinyl ester copolymer or an ethylene-acrylic ester copolymer having a comonomer concentration of 20% by weight or less, preferably 10% by weight or less.

These olefin polymers used in the present invention have a density of 0.935 g/cm$^3$ or less, preferably from 0.930 to 0.900 g/cm$^3$, more preferably from 0.930 to 0.910 g/cm$^3$ When the above-mentioned density is more than the above-mentioned upper limit, i.e., 0.935 g/cm$^3$, a clearance between the melting points of the orientated polyethylene layer (A) and the adhesive layer (B) is small, so that temperature conditions are limited in the heating lamination step and sufficient adhesive strength cannot be obtained unpreferably. Moreover, the intrinsic viscosity [$\eta$] of the olefin polymer is usually from 0.5 to 3 dl/g, preferably from 1 to 2 dl/g.

These olefin polymers having the above specific properties may be blended with compounds other than the above-mentioned olefin polymers in so far as these compounds do not disturb the achievement of the objects of the present invention. Examples of such other compounds include mutual copolymers such as ethylene, propylene, butene-1, 4-methylpentene-1, hexene-1 and octene-1, copolymers such as ethylene-propylene copolymer rubber, ethylene-propylene-diene copolymer rubber, copolymers of ethylene and vinyl ester, unsaturated carboxylic acid, unsaturated carboxylic ester or the like, polyisobutylene and mixtures thereof.

The unsaturated carboxylic acid for modifying the above-mentioned olefin polymer is a monobasic acid or a dibasic acid, and typical examples of these acids include acrylic acid, propiolic acid, methacrylic acid, crotonic acid, isocrotonic acid, oleic acid, elaidic acid, maleic acid, fumaric acid, citraconic acid, mesaconic acid and mixtures thereof.

Examples of the derivatives of the unsaturated carboxylic acid include metallic salts, amides, esters and anhydride of the above-mentioned unsaturated carboxylic acids, and above all, maleic anhydride is most preferable.

The modification of the olefin polymer with the unsaturated carboxylic aid and/or its derivative proceeds as follow:

The unsaturated carboxylic acid or its derivative (hereinafter referred to simply as "unsaturated carboxylic acid") is added to the ethylene-$\alpha$-olefin copolymer or the olefin polymer composition containing the above-mentioned copolymer as the main component. In this case, the amount of the unsaturated carboxylic acid is from 0.05 to 10% by weight, preferably from 0.1 to 7% by weight with respect to the weight of the olefin. Afterward, they are heated in the presence of an organic peroxide, so that reaction occurs.

This reaction can be carried out by melting and mixing the materials in a kneader such as an extruder or a Banbury mixer in the absence of a solvent, or alternatively the above reaction may be done by heating and mixing them in a solvent such as an aromatic hydrocarbon such as benzene, xylene or toluene, or an aliphatic hydrocarbon such as hexane, heptane or octane. The former procedure is more preferable, because of simple operation, being economical, and continuous connection to a subsequent step.

Next, the thus modified olefin polymer is suitably molded into a sheet or film in a known manner in order to obtain the desired adhesive layer.

When the amount of the unsaturated carboxylic acid is in excess of 10% by weight, decomposition and crosslinking reaction tend to take place together besides the addition reaction. Inversely, when it is less than 0.05% by weight, the object of the present invention of improving the adhesive properties cannot be achieved.

Suitable examples of the organic peroxide include benzoyl peroxide, lauryl peroxide, azobisisobutyronitrile, dicumyl peroxide, t-butyl hydroperoxide, $\alpha,\alpha'$-bis(t-butylperoxydiisopropyl)benzene, di-t-butyl peroxide and 2,5-di(t-butylperoxy)hexyne. The organic peroxide is used in an amount of from 0.005 to 2.0 parts by weight, preferably from 0.01 to 1.0 part by weight based on 100 parts by weight of the total amount of the reaction product of the above-mentioned rubber and unsaturated carboxylic acid and the olefin polymer. When the amount of the organic peroxide is less than 0.005 part by weight, the effect of the modification cannot be exerted substantially, and when it is more that 2.0 parts by weight, any additional effect is scarcely obtained and moreover excessive decomposition and crosslinking reaction tend to occur.

(3) Preparation of laminate

The laminate of the present invention is basically composed of the above-mentioned orientated polyethylene (A) and the adhesive layer (B), and these layers (A) and (B) may be laminated repeatedly to form a multi-layer laminate, or they may be interposed between other substrates to form a multi-layer structure. That is, examples of the multi-layer laminates include two-layer, three-layer, four-layer and five-layer laminates of A/B, B/A/B, A/B/A, A/B/C (C means another kind of material layer), A/B/C/B, B/A/B/A, C/B/A/B, C/B/A/B/C and the like.

The orientated polyethylene layer (A) used in the present invention has a high anisotropy, and physical values in the orientation direction of the layer (A) are noticeably different from those in the direction perpendicular to the orientation direction. Therefore, when the plural layers are used, they should be laminated so that the orientation directions of these layers may deviate from each other, for example, as much as an angle of from more than 0° to 90° or less, preferably an angle of 10° to 90°, whereby the laminate can be obtained in which the anisotropy is extremely decreased and physical properties such as strength and modulus of elasticity are balanced.

The materials, usable in the laminate, other than the layers (A) and (B) include synthetic resins such as polyamide resin, polyvinylidene chloride resin, saponified material of ethylene-vinyl acetate copolymer, polyester resin, polyvinyl chloride resin, polystyrene resin, ABS resin, polycarbonate resin, polyvinyl alcohol resin, fluorine-contained resin, polyphenylene oxide resin, polyphenylene sulfide resin, polyether-ether ketone resin, polyamide-imide resin, polyimide resin, polyacetal resin, polysulfone resin, polyarylate resin, polyether imide resin and polyparabanic acid resin, synthetic and natural rubbers such as ethylene-propylene copolymer rubber, ethylene-propylene-diene copolymer rubber, polybutadiene rubber, butadiene-styrene copolymer rubber, butadiene-acrylonitrile rubber, polychloroprene rubber, acrylic rubber and silicone rubber, metals such as aluminum, iron, zinc and copper, woods such as veneer boards and pylwood board, glass, ceramics, concrete, gypsum, asbestos, FRP, and woven and unwoven fabrics and papers of natural fibers, synthetic fibers and mineral fibers such as carbon fiber, aramide fiber and metallic fiber.

The laminate of the present invention can be formed by press molding, air-pressure forming (vacuum forming) or rolling, and these molding techniques can be optionally employed. For example, the orientated polyethylene sheet (A) which has been previously molded, the sheet-like adhesive layer (B) and, if necessary, the sheet (C) of another kind of material are laminated onto each other, and they are then molded by means of a press molding machine, the temperature of which is adjusted to a level higher than the melting point of the adhesive layer (B) and lower than the melting point of the orientated polyethylene sheet (A), in order to obtain the integrally molded laminate. At this time, pressure is from 0.1 to 40 MPa, preferably from 1 to 20 MPa.

The laminate of the present invention is formed preferably at a temperature lower than the melting point of the orientated polyethylene (A), more preferably at a temperature lower than the melting point of the orientated polyethylene (A) or higher than the melting point of the adhesive layer (B), most preferably in a temperature range of from 120° to 135° C. In the laminate obtained at a temperature more than the melting point of the polyethylene (A), tensile strength and modulus of tensile elasticity are unpreferably low.

Any particular restriction is not put on the morphology of the laminate of the present invention, and therefore the laminate can take any shape of a film, a sheet, a tube, a plate, a pipe, a bottle, a container and the like.

Now, the present invention will be described in detail in reference to examples, but the scope of the present case should not be limited to these examples.

EXAMPLE 1

An ultra-high-molecular-weight polyethylene powder (melting point 143° C.) having an intrinsic viscosity of 18 dl/g in decalin at 135° C. was compression-molded at a temperature of 130° C. under a pressure of about 100 kg/cm$^2$ by the use of a press molding machine in order to obtain a 100-mm-wide, 100-mm-long, 1.2-mm-thick sheet. It was confirmed by measurement that the melting point of the thus obtained sheet was 143° C. which was the same as in its powdery state.

Next, this sheet was fed to between a pair of rolls having a roll clearance of 70 μm and an adjusted roll surface temperature of 135° C. in order to roll the sheet 6 times in terms of its length. The rolled sheet was then cut to remove its opposite side end portions therefrom so that its width might be 75 mm, and the sheet was then subjected to tensile orientation at a temperature of 135° C. at a tensile velocity of 50 mm/minute by the use of a tensile test machine with a thermostat bath so that the original sheet might be drawn 5 times in terms of its length (the total magnification of the rolling and the tensile orientation 30 times), whereby the orientated sheet having a width of 40 mm and a thickness of 150 μm was obtained. This sheet was then cut into pieces having a length of 40 mm, and each sheet piece would be used as a sheet (A).

On the other hand, 0.2 part by weight of maleic anhydride and an organic peroxide (2,5-dimethyl-2,5-di(t-butylperoxyhexane-3) were added to 100 parts by weight of straight-chain polyethylene having an MI of 1.0 and a density of 0.920, and they were then kneaded at 200° C. for 15 minutes by means of a Banbury mixer. Afterward, a inflation film having a thickness of 30 μm was formed therefrom. This film was then cut into 40-mm-wide, 40-mm long pieces which would be used as films (B).

The two sheets (A) were superposed upon each other so that orientating directions of the sheets might deviate from each other as much as 90°, and the film (B) was then interposed between these sheets (A). They were then pressed at a temperature of 135° C. under a pressure of 100 kg/cm$^2$ for one minute by the use of a pressing machine again, thereby obtaining a laminate.

The thus obtained laminate had a tensile strength of 0.8 GPa and a modulus of elasticity of 75 GPa. Furthermore, the adhesive strength of the two sheets (A) was 3.8 kg/4 cm which was such that the sheets were sufficiently practical.

Comparative Example 1

In Example 1, the molding of a sheet was carried out at 145° C., and in this case, the resulting sheet had a melting point of 136° C. Rolling and then tensile orientation were done in the same manner as in Example 1, but the total orientation magnification was as low as 10 times. The resulting laminate had a tensile strength of 0.35 GPa and a modulus of elasticity of 22 GPa.

Comparative Example 2

In Example 1, lamination was carried out at 150° C., and in this case, the resulting laminate had a tensile strength of 0.54 GPa and a modulus of elasticity of 31 GPa.

Comparative Example 3

In Example 1, straight-chain polyethylene which was not modified with maleic anhydride was used as an adhesive layer, and in this case, adhesive strength was 1.5 kg/4 cm. After all, any satisfactory laminate was not obtained.

Comparative Example 4

In Example 1, rolling was effected at a roll temperature of 145° C., and in this case, extension was scarcely achieved substantially, and when tensile orientation was done, it was difficult to obtain 5-fold or more orientation magnification.

Comparative Example 5

In Example 1, an unorientated ultra-high-molecular-weight polyethylene sheet having a thickness of 150 μm was used as the sheet (A) in order to form a laminate. The resulting laminate had a tensile strength of 35 MPa and a modulus of elasticity of 1.1 GPa.

In this connection, melting points and some physical properties were measured as follows:

[Measurement of melting point]

On a DSC device, 5 mg of a sample was set, and measurement was then made at a temperature rise rate of 10° C./minute. A temperature at which the top of an endothermic peak was present was regarded as a melting point.

[Tensile strength, modulus of elasticity and adhesive strength]

Modulus of elasticity and tensile strength were measured at a temperature of 23° C. at a tensile velocity of 100 mm/minute by the use of a strograph R. The modulus of elasticity was calculated from a value of stress at a strain of 0.1%. The sectional area of the sample which was necessary for the calculation was obtained by measuring the weight and length of the sample on condition that the density of polyethylene was regarded as 1 g/cm$^3$.

Furthermore, tensile strength was obtained by measuring a layer peeling strength when peeling was made at 180° at a tensile velocity of 150 mm/minute by the use of the same test device.

What is claimed is:
1. A laminate comprising
(A) an orientated polyethylene layer obtained by orientating an ultra-high-molecular-weight polyethylene sheet having an intrinsic viscosity of 5 to

50 dl/g in decalin at 135° C., at a temperature lower than the melting point of said polyethylene, and wherein said ultra-high-molecular-weight polyethylene sheet is prepared by a process consisting essentially of compression molding said ultra-high-molecular weight polyethylene at a temperature below the melting point of said ultra-high-molecular weight polyethylene, and (B) an adhesive layer containing a resin obtained by modifying an olefin polymer with an unsaturated carboxylic acid and/or its derivative, and at least one additional layer of said ultra-high-molecular-weight polyethylene sheet (A).

2. A laminate according to claim 1 wherein said ultra-high-molecular-weight polyethylene for said orientated polyethylene layer (A) is what is obtained by the homopolymerization of ethylene or the copolymerization of ethylene and an α-olefin, 3. A laminate according to claim 2 wherein said α-olefin has 3 to 12 carbon atoms.

4. A laminate according to claim 2 wherein the content of said α-olefin in said ethylene-α-olefin copolymer is from 0.001 to 10 mole %.

5. A laminate according to claim 1 wherein a temperature at which ethylene for said orientated polyethylene layer (A) is polymerized is in a range of from −20° to 110° C.

6. A laminate according to claim 1 wherein a temperature at which said ultra-high-molecular-weight polyethylene for said orientated polyethylene layer (A) is orientated is in a range of from 20° to 160° C.

7. A laminate according to claim 1 wherein a rolling magnification (length of the sheet after the rolling/that of the sheet before the rolling) which is a deformation ratio of said ultra-high-molecular-weight polyethylene for said orientated polyethylene layer (A) by the rolling operation is in a range of from 1.2 to 20.

8. A laminate according to claim 1 wherein the melting point of said ultra-high-molecular-weight polyethylene for said orientated polyethylene layer (A) after the compression molding or the rolling is in a range of the formula $$T_{m1} \geqq T_{m0} - 5$$

wherein $T_{m0}$ denotes the melting point of an ultra-high-molecular-weight polyethylene powder.

9. A laminate according to claim 1 wherein said orientated polyethylene layer (A) has a thickness of 50 to 500 μm.

10. A laminate according to claim 1 wherein said olefin polymer for said adhesive layer (B) is ethylene polymer or ethylene-α-olefin copolymer prepared in the presence of a Ziegler catalyst, ethylene polymer or copolymer prepared by high-pressure radical polymerization, or a mixture thereof.

11. A laminate according to claim 10 wherein said α-olefin in said olefin polymer for said adhesive layer (B) has 3 to 12 carbon atoms.

12. A laminate according to claim 10 wherein an α-olefin content in said ethylene-α-olefin copolymer for said adhesive layer (B) is 20 mole % or less.

13. A laminate according to claim 10 wherein said ethylene copolymer for said adhesive layer (B) prepared by said high-pressure radical polymerization is ethylene-vinyl ester copolymer or ethylene-acrylic ester copolymer.

14. A laminate according to claim 13 wherein the concentration of comonomers in said ethylene-vinyl ester copolymer or ethylene-acrylic ester copolymer is 20% by weight or less.

15. A laminate according to claim 1 wherein the density of said olefin polymer for said adhesive layer (B) is 0.935 g/cm$^3$ or less.

16. A laminate according to claim 15 wherein the density of said olefin polymer for said adhesive layer (B) is in a range of from 0.930 to 0.900 g/cm$^3$.

17. A laminate according to claim 1 wherein the intrinsic viscosity of said olefin polymer for said adhesive layer (B) is in a range of from 0.5 to 3 dl/g.

18. A laminate according to claim 1 wherein said olefin polymer for said adhesive layer (B) is a mutual copolymer such as propylene, butene-1, 4-methylpentene-1, hexene-1 or octene-1, ethylene-propylene copolymer rubber, ethylene-propylene-diene copolymer rubber, a copolymer of ethylene and vinyl ester, unsaturated carboxylic acid or unsaturated carboxylic ester, polyisobutylene, or a mixture thereof.

19. A laminate according to claim 1 wherein said unsaturated carboxylic acid for modifying said olefin polymer for said adhesive layer (B) is acrylic acid, propiolic acid, methacrylic acid, crotonic acid, isocrotonic acid, oleic acid, elaidic acid, maleic acid, fumaric acid, citraconic acid, mesaconic acid or a mixture thereof.

20. A laminate according to claim 1 wherein said derivative of said unsaturated carboxylic acid for modifying said olefin polymer for said adhesive layer (B) is a metallic salt, an amide, an ester or an anhydride of said unsaturated carboxylic acid.

21. A laminate according to claim 20 wherein said derivative of said unsaturated carboxylic acid for modifying said olefin polymer for said adhesive layer (B) is maleic anhydride.

22. A laminate according to claim 1 wherein said unsaturated carboxylic acid or its derivative for modifying said olefin polymer for said adhesive layer (B) is used in an amount of 0.05 to 10% by weight with respect to an ethylene-α-olefin copolymer or an olefin polymer composition containing this copolymer as the main component in the presence of an organic peroxide.

23. A laminate according to claim 22 wherein the amount of said organic peroxide which is added to said unsaturated carboxylic acid or its derivative for modifying said olefin polymer for said adhesive layer (B) is in a range of from 0.005 to 2.0% by weight.

24. A laminate according to claim 1 which is a multilayer laminate basically comprising a repeated structure of said orientated polyethylene layer (A) and said adhesive layer (B), or a single-layer or a multi-layer laminate comprising said layers (A) and (B) and another material interposed between said layers (A) and (B).

25. A laminate according to claim 1 which is a laminate comprising said orientated polyethylene layer (A) and said adhesive layer (B) which is prepared at a temperature lower than the melting point of said orientated polyethylene layer (A).

26. A laminate according to claim 1 which is a laminate comprising said orientated polyethylene layer (A) and said adhesive layer (B) which is prepared at a temperature lower than the melting point of said orientated polyethylene layer (A) or at a temperature higher than the melting point of said adhesive layer (B).

27. A laminate according to claim 1 which is a laminate comprising said orientated polyethylene layer (A) and said adhesive layer (B) which is prepared at a temperature in a range of from 120° to 135° C.

28. A laminate according to claim 1 wherein said ultra-high-molecular-weight polyethylene for said oriented polyethylene layer (A) has been oriented by a tensile orientation or a roller and tensile orientation.

29. A laminate according to claim 1 wherein said ultra-high-molecular-weight polyethylene for said oriented polyethylene layer (A) has been oriented with an orientation magnification of from 20 to 200 times.

30. A laminate according to claim 1 wherein said ultra-high-molecular-weight polyethylene for said oriented polyethylene layer and adhesive layer containing a resin obtained by modifying an olefin polymer with an unsaturated carboxylic acid and/or its derivative in the presence of an organic peroxide so that reaction occurs;
   wherein said oriented polyethylene layer (A) and said adhesive layer (B) are laminated together at a temperature lower than the melting point of said polyethylene.

31. The laminate of claim 1, wherein said oriented polyethylene layer (A) is processed without a melting step before said orienting.

32. The laminate of claim 1, wherein said polyethylene is produced by polymerizing ethylene or copolymerizing ethylene and an α-olefin at a temperature lower than the melting point of said ultra-high-molecular-weight polyethylene.

33. The laminate of claim 32, wherein said oriented polyethylene layer is produced by a process consisting essentially of said polymerizing or copolymerizing step and said orienting step.

34. The laminate of claim 1, further comprising, a second oriented polyethylene layer (A′) layered on said adhesive layer, obtained by orienting an ultra-high-molecular-weight polyethylene sheet at a temperature lower than the melting point of said polyethylene, said ultra-high-molecular-weight polyethylene having an intrinsic viscosity of 5–50 dl/g in decalin at 135° C. and said polyethylene having an orientation magnification of 20 times or more,
   wherein said layer (A) and said layer (A′) have orientation directions which deviate from each other at an angle of from 10° to 90°.

35. The laminate of claim 1, wherein said orientation magnification is 60 times or more.

36. The laminate of claim 35, wherein said orientation magnification is from 80 to 200 times.

* * * * *